(12) United States Patent  
Slatter

(10) Patent No.: US 6,668,745 B2  
(45) Date of Patent: Dec. 30, 2003

(54) OUTRIGGER ASSEMBLY

(75) Inventor: Stephen O. Slatter, Sunrise, FL (US)

(73) Assignee: Taco Metals, Inc., Miami, FL (US)

( * ) Notice: Subject to any disclaimer, the term of this patent is extended or adjusted under 35 U.S.C. 154(b) by 0 days.

(21) Appl. No.: 10/191,128

(22) Filed: Jul. 9, 2002

(65) Prior Publication Data

US 2003/0005616 A1 Jan. 9, 2003

Related U.S. Application Data

(60) Provisional application No. 60/304,004, filed on Jul. 9, 2001.

(51) Int. Cl.[7] ............................................. B63B 35/14
(52) U.S. Cl. ...................................................... 114/255
(58) Field of Search ................. 114/255, 364; 43/21.2, 27.4

(56) References Cited

U.S. PATENT DOCUMENTS

| 5,445,102 | A | * | 8/1995 | Rupp | 114/255 |
| 5,855,088 | A | * | 1/1999 | Lee | 43/21.2 |
| 5,921,196 | A | * | 7/1999 | Slatter | 114/255 |
| 6,053,122 | A | * | 4/2000 | Jordan, III | 114/255 |
| 6,408,779 | B1 | * | 6/2002 | Roy | 114/255 |

* cited by examiner

Primary Examiner—Stephen Avila  
(74) Attorney, Agent, or Firm—Robert M. Schwartz

(57) ABSTRACT

A sport fishing outrigger assembly is disclosed that includes a boom attachment arm having a distal end portion and proximal end portion, a rotating arm having a distal head portion capable of releasable attachment to the proximal end portion and a handle engagement, an adjuster for adjusting the releasable attachment of the distal head portion to the proximal end portion, an indexing sleeve secured to the rotating arm, a rotator operatively engaged to the rotating arm, and a handle operatively engaged to the handle engagement and the rotator.

18 Claims, 7 Drawing Sheets

OUTRIGGER ASSEMBLY

CROSS-REFERENCES TO RELATED APPLICATION

This application claims the benefit of U.S. Provisional Application Serial No. 60/304,004, filed on Jul. 9, 2001, entitled OUTRIGGER ASSEMBLY.

FIELD OF THE INVENTION

This invention relates to the field of sport fishing, and particularly to an outrigger mounting system having a vertically adjustable outrigger mounting arm assembly capable of rotational movement.

BACKGROUND OF THE INVENTION

Saltwater sport fishing typically consists of anglers positioned on boats that are then dispatched to prolific offshore fishing areas. One useful method of catching gamefish involves a technique known as trolling. Trolling is the practice of baiting hooks that are subsequently lowered and dragged behind the stern of a slow moving vessel by the angler. In order to increase the chances of hooking a fish, it is beneficial to have as many lines in the water as possible. To a gamefish, the wake of a vessel generally creates the appearance of a large school of smaller fish to be preyed upon. The angler can strategically simulate bands of straggling or displaced fish from the school with numerous baited lines. These simulated straggling fish are misinterpreted to be the disadvantaged and weakened fish that gamefish frequently utilize as a food source.

As stated above, an angler will often drag as many baited lines from behind the boat as possible, thereby increasing the chances of hooking a fish. However, as more baited lines are used, the probability of the lines becoming entangled with one another increases. This is a problem that occurs in a variety of situations, such as with a narrow beam boat or any boat that is in the process of being turned. As a result, sport fishing outriggers have been developed to assist in keeping the various lines separated. However, the positioning and lowering of outrigger booms presents additional problems of rotational movement and preventing the booms from contacting the water. This problem has brought forth various attempts to create mechanisms to rotate the boom and that prevent the boom from contacting the water.

Outriggers consist of a long pole, or boom, having one end secured to the boat with deployment resulting from an outward lateral extension of the boom from a side of the boat. Baited fishing lines often have integrated release clips that are attached to the outriggers, thereby providing sufficient separation between the lines to prevent tangling. When a fish is hooked on the bait line, the line clip releases from the outrigger, thus allowing the angler to reel in the fish.

Outriggers are required to be freely stowable to a position beside the boat for close quarters operation and docking. For practicality, the outrigger should be swung laterally outward to its deployed position. The prior art includes various types of mounting schemes including outrigger units for horizontal and vertical mounting, on center consoles, flybridges, half towers, tuna towers, radar arches, and/or T-tops. Prior patents disclose a variety of methods for mounting, deploying, and locking such outriggers into place (see e.g. U.S. Pat. Nos. 5,445,102 and 3,724,791), with each having distinct drawbacks. Such drawbacks include overall mechanical complexity; powered operation; non-durable construction; and/or ineffective position adjustment and locking mechanisms that slip and/or wear out.

Although the prior art discloses a vast array of mechanisms and mounting locations for outrigger mounts, the prior art fails to disclose or otherwise teach a simple and durable outrigger system having an effective boom locking mechanism, a boom stop that prevents excessive lowering, and a positionable arm that allows for both vertical and rotational movement of the boom. This is of particular importance with respect to the excessive forces experienced by an outrigger mount during operation. Both wind and movement (of the boat) impart forces on to a boom, thereby increasing the stresses on the outrigger mount of the boom. Generally, the longer the boom, the greater the stresses at the outrigger mount. If the position adjustment and/or locking mechanism were to succumb to these increases in stress, the outrigger might swing in an unrestricted manner during a critical maneuver or operation, with potentially disastrous or life-threatening results to passengers of the outrigger equipped boat or other surrounding vessels. Accordingly, an outrigger assembly with a novel position adjustment and locking mechanism is disclosed that alleviates this and other shortcomings of the prior art.

As described in the aforementioned prior art, the mounting and operation of a conventional outrigger system can be complicated. Booms of considerable length must be stored in an upright position to allow the vessel to pass beneath low bridges, as well as for close quarters maneuvering. Similarly, should the boat pass under or through an object that limits clearance, the boom must be vertically lowered and/or rotated in from the extended position on a non-vertical plane. Preferably the outrigger mount not only rotates in the non-vertical plane in a 360° arrangement from a position on the vessel, but also allows the boom attachment arm to be easily raised and lowered in a vertical plane. Thus, in the operation of a one way of several conventional outrigger booms, the boom is inserted into a vertically adjustable boom attachment arm, usually as part of an elbow, and locked into position with a locking pull pin. The outrigger boom is then rotated in a non-vertical plane to a point determined by the user. Additionally, either before or after the boom is rotated in the non-vertical plane, the user may raise or lower the boom within a vertical plane with respect to the outrigger mount.

Accordingly, what is lacking is an outrigger assembly having an effective boom locking mechanism, a boom stop that prevents excessive lowering, and a positionable arm that allows for both vertical and rotational movement of the boom to eliminate the complicated and problematic outrigger mounts commonly used to support outrigger booms.

SUMMARY OF THE INVENTION

The present invention eliminates the above-mentioned needs for an outrigger assembly by providing an outrigger assembly having a positionable arm that allows for both vertical and rotational movement of the boom and a boom stop that prevents excessive lowering.

In accordance with the present invention, there is provided an outrigger assembly. The outrigger assembly includes a boom attachment arm having a distal end portion and a proximal end portion, a rotating arm having a distal head portion capable of releasable attachment to the proximal end portion and a handle engagement, and adjustor for adjusting the releasable attachment of the distal head portion to the proximal end portion, an indexing sleeve secured to the rotating arm, a rotator operatively engaged to the rotating arm, and a handle operatively engaged to the handle engagement and the rotator.

The present invention is further directed to a method for adjusting a boom. The method includes the steps of inserting a boom into an outrigger assembly, securing the boom with a pin, rotationally positioning the boom within a first plane, rotationally positioning the boom within a second plane, and wherein the first plane and the second plane are perpendicular to one another.

Accordingly, it is an objective of the present invention to disclose a sport fishing outrigger assembly that is capable of rotation in a first plane and rotation in a second plane.

A related objective of this invention is to provide an outrigger mount employing a pull-pin to secure the outrigger boom.

DETAILED DESCRIPTION OF THE PREFERRED EMBODIMENT

Figure 1:
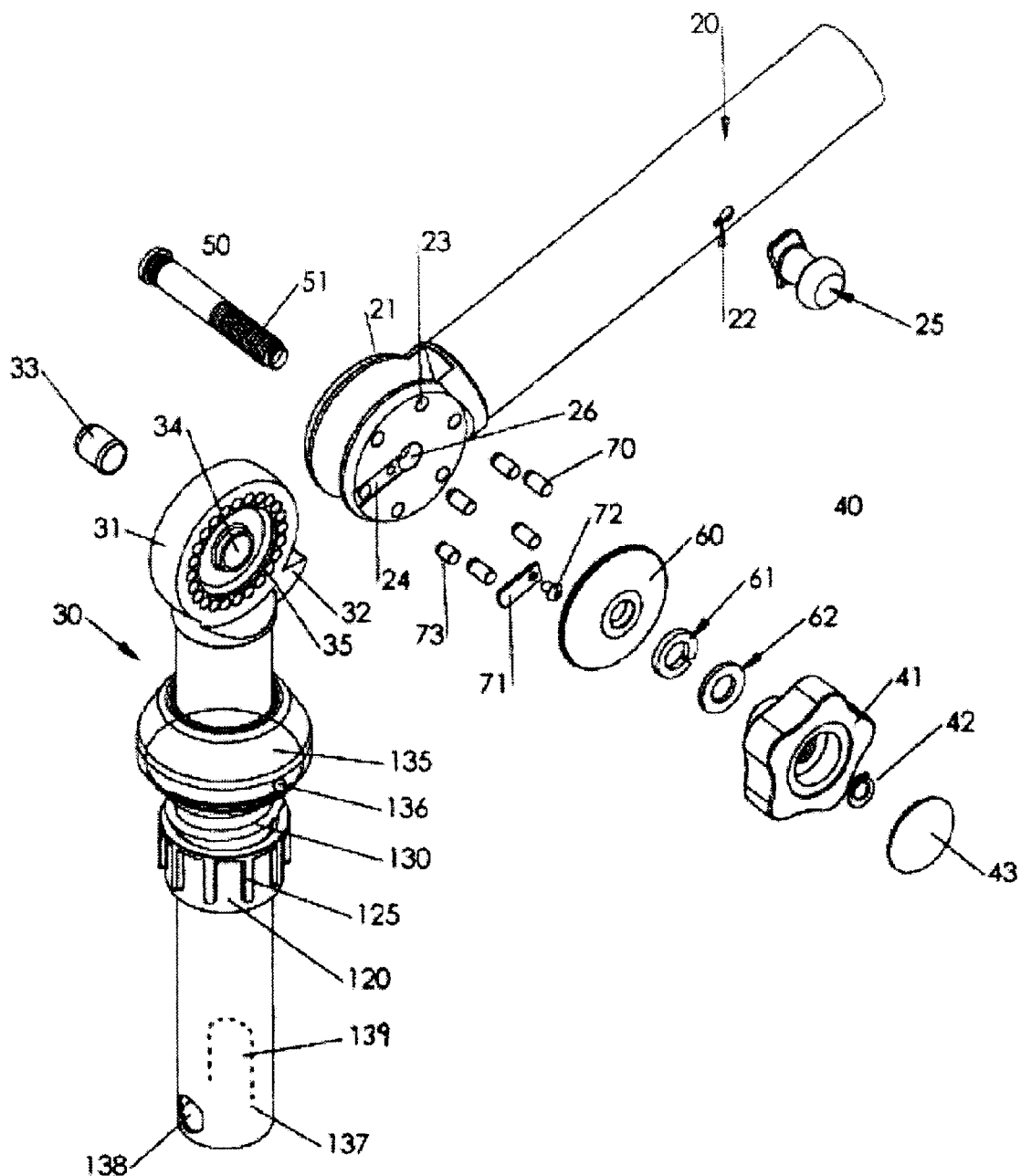
FIG. 1 is a partial illustration of the outrigger assembly in disassembled form.

Referring now to FIG. 1, an embodiment of the present invention is illustrated in disassembled form. Outrigger assembly 10 includes boom attachment arm 20. Boom attachment arm 20 accommodates an outrigger boom. Boom attachment arm 20 incorporates a pull-pin 25 through hole 22 to secure an outrigger boom within boom attachment arm 20.

Pull-pin 25 is spring loaded and outwardly engaged to subsequently release the outrigger boom. Boom attachment arm 20 terminates into a proximal end portion 21. Proximal end portion 21 incorporates bullet holes 23 for accommodating bullets 70 and detent bullet 73. Proximal end portion 21 further includes joint screw hole 26 and detent region 24. Detent region 24 accommodates detent 71 and detent screw 72.

Boom attachment arm 20 is secured to rotating arm 30 by joint screw 50 and further secured in an angled position by washer group 40. Washer group 40 is composed of adjustor 41, locking circlip 42, cap 43, washers 61 and 62, washer plate 60, bullets 70, detent plate 71 and detent bullet 73.

Rotating arm 30 also includes distal head portion 31. Distal head portion 31 has joint screw hole 34 for incorporating pivot bush 33. Distal head portion 31 further includes dimples 35 and boom stop 32. Rotating arm 30 also incorporates a sealing tube cap 135. Sealing tube cap 135 houses a sealing tube hole 136 for permitting sealing tube cap to be tightened to sealing tube 80. A seal to prevent exposure to the environment can be used between sealing tube cap 135 and rotating arm 30.

Affixed to sealing tube cap 135 is a compressible spring 130 that contacts indexing sleeve 120. Indexing sleeve 120 has interfacing ridges 125. Rotating arm 30 has a proximal end region 137 that provides handle engagement opening 138 and front handle slot 139.

Figure 2:
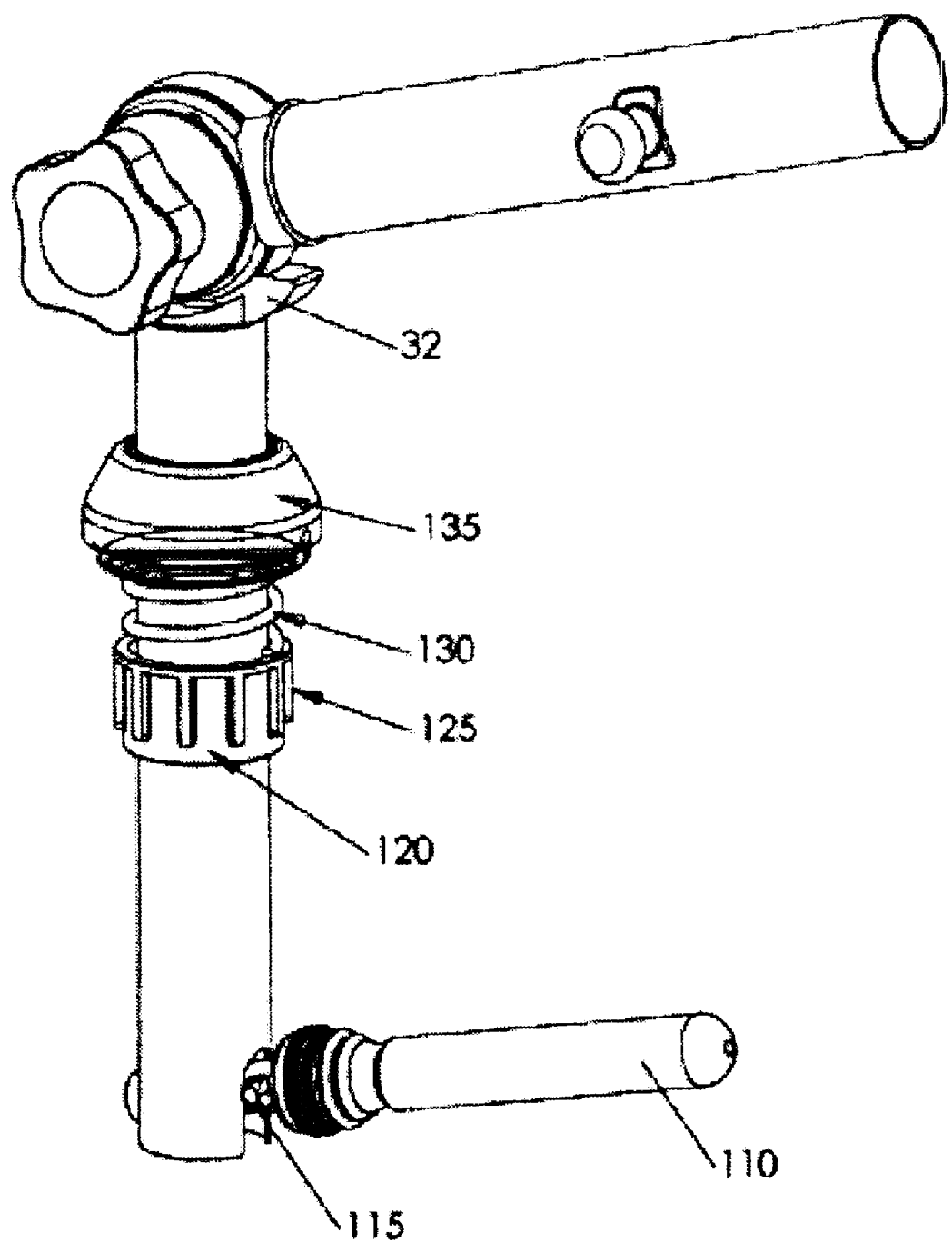
FIG. 2 is an illustration of the outrigger assembly of FIG. 1 in operative engagement.

FIG. 2 illustrates the operative engagement of boom attachment arm 20 and rotating arm 30. Proximal end portion 21 is positioned around distal head portion 31. Joint screw holes 26 and 34 are aligned, with joint screw hole 34 housing pivot bush 33. Joint screw 50 is passed through aligned joint screw holes 26 and 34, and threaded through pivot bush 33. Pivot bush 33 prevents gauling and seizing during angle adjustment of the boom attachment arm 20. Joint screw 50 incorporates a retaining circlip on the threaded end to prevent adjustor 41 from being unscrewed too far. Washer group 40 is fastened on threaded region 51 of joint screw 50. As washer group 40 is positioned closer to proximal end portion 21, bullets 70 pass into bullet holes 23.

When an appropriate angle for boom attachment arm 20 is desired, the user rotates arm 20 in a vertical plane. Detent 71 provides the user with a feel for the location of the dimples 35, so that the user can tighten washer group 40. Detent plate 71 is fastened to proximal end portion 21 by a detent screw 72.

Detent 71 is placed in a position above a detent bullet 73, so that when the boom attachment arm 20 is pivoted, detent plate 71 presses down on detent bullet 73. This action causes detent bullet 73 to partially engage dimples 35, so that the user can determine the location of dimples 35. Once the appropriate dimple is found, thus providing an appropriate angle for boom attachment arm 20, washer group 40 secures arm 20. The tightening of washer group 40 pushes bullets 70 partially through bullet holes 23 and into dimples 35, and thus provides a secured angle for the boom attachment arm 20.

The angle is limited by boom stop 32 so that the outrigger boom does not contact any undesired objects, such as water or bystanders.

FIG. 2 also shows handle 110 in operative engagement with rotating arm 30. Handle 110 passes through proximal end region 137 and into handle engagement opening 138 by way of front handle slot 139. Handle 110 has handle pivots 115 to provide a pivot point for handle 110 to push operatively engaged arms 20 and 30 along the longitudinal axis of rotating arm 30.

Figure 3:
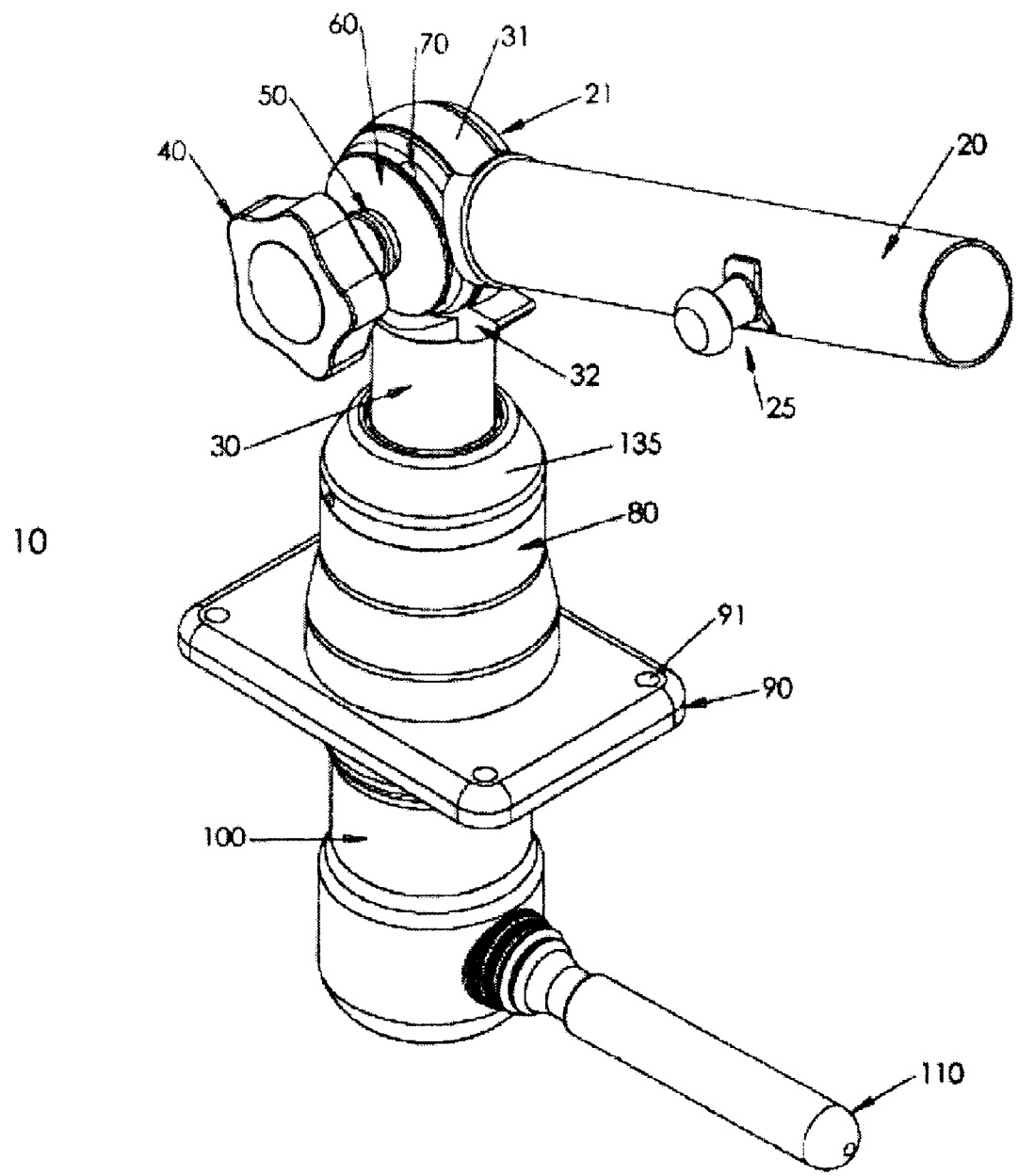
FIG. 3 is a complete illustration of the outrigger assembly of FIG. 2.
Figure 6:
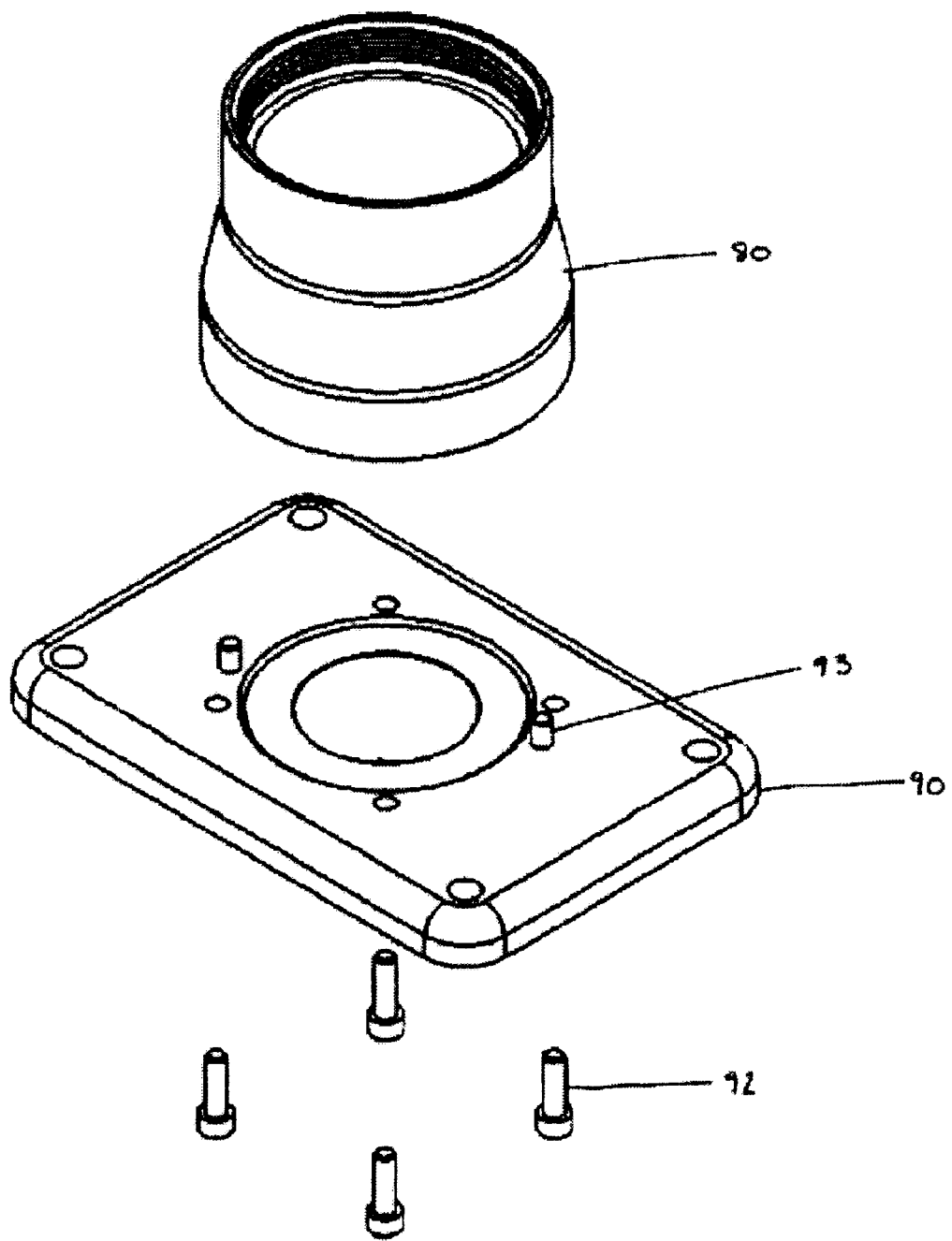
FIG. 6 is an illustration of the sealing tube and mounting plate in disassembled form.
Figure 7:
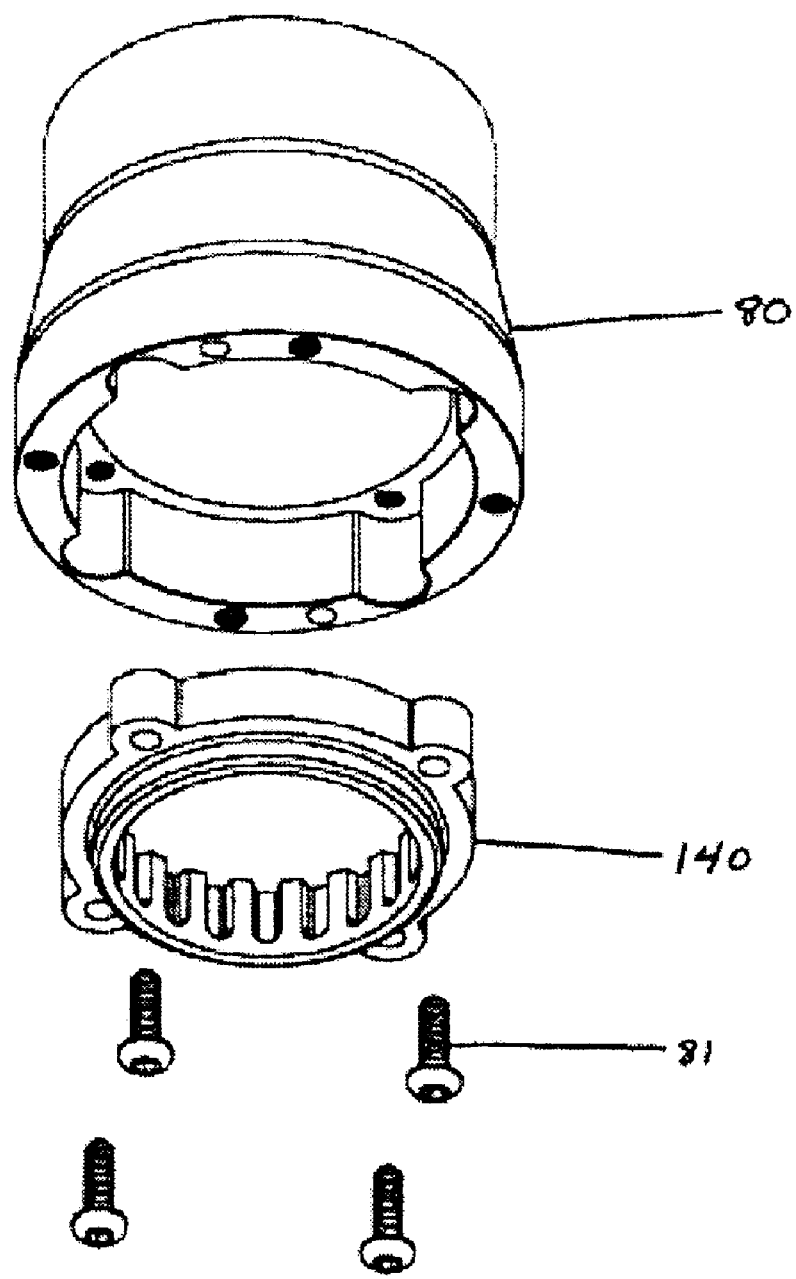
FIG. 7 is an illustration of the sealing tube of FIG. 6 and locking ring of FIG. 4 in disassembled form.

FIG. 3 illustrates the complete assembly 10. In this view, sealing tube cap 135 is affixed to sealing tube 80. Sealing tube 80 protects the compressible spring 130 and indexing sleeve 120. Sealing tube 80 is further affixed to locking ring 140, as is shown in FIG. 7 and discussed in detail below. Locking ring 140 is thus secured to sealing tube 80, which is integrally connected to mounting plate 90, as shown in FIG. 6 and also discussed in detail below. Rotator 100 provides an attachment for handle 110 and can include seals to prevent exposure to the environment. Moreover, rotator 100 can include bushes (not shown) to further prevent seizing and gauling between rotator 100 and other structures, such as rotating arm 30 and compressible spring 130, and to reduce drag. In such a situation, compressible spring 130 can engage a bush, such as one internal to sealing tube cap 135.

Figure 4:
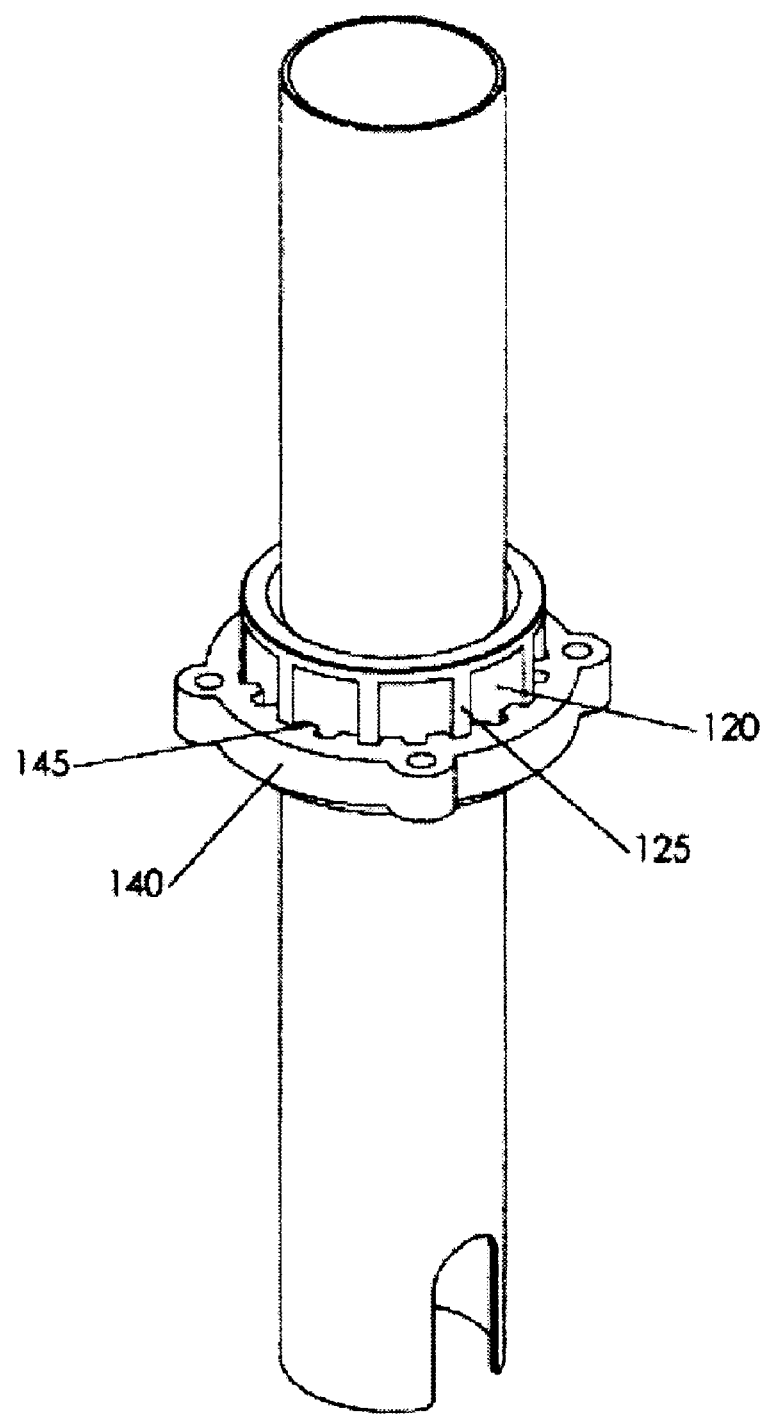
FIG. 4 is an illustration of the engagement of the indexing sleeve and locking ring.
Figure 5:
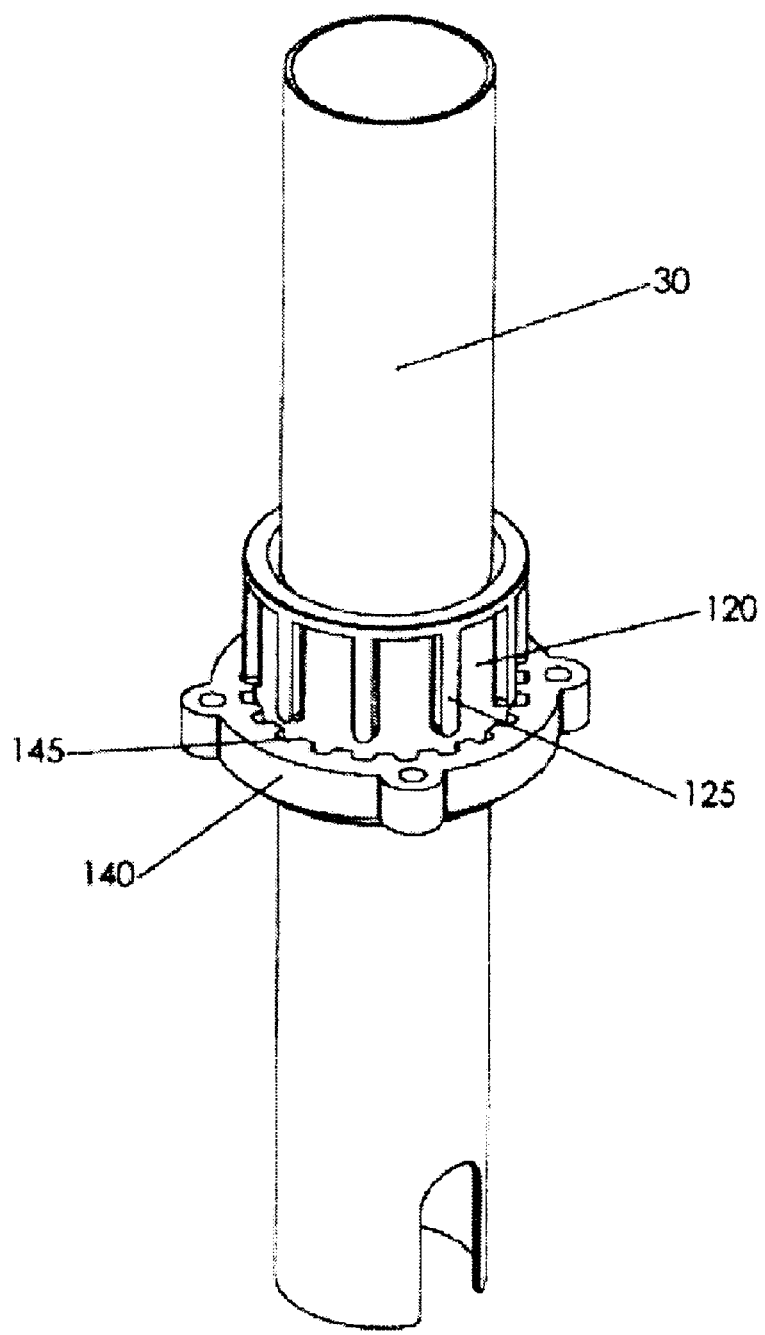
FIG. 5 is an illustration of the disengagement of the indexing sleeve and locking ring of FIG. 4.

FIGS. 4 and 5 show the slidable engagement of the indexing sleeve 120 and locking ring 140. FIG. 4 illustrates the secured arrangement of indexing sleeve 120 and locking ring 140. When secured, interfacing ridges 125 of indexing sleeve 120 engage teeth 145 of locking ring 140. This engagement allows for handle 110 to lift operatively engaged arms 20 and 30 along an axis in a vertical plane. When handle 110 is operatively engaged in a vertical plane, operatively engaged arms 20 and 30 are lifted. This lifting action causes interfacing ridges 125 of indexing sleeve 120 to disengage teeth 145 of locking ring 140. This disengagement allows for handle 110 to rotate operatively engaged arms 20 and 30 along a 360° axis in a horizontal plane. Thus, handle 110 can be rotationally engaged in a horizontal plane to rotate operatively engaged arms 20 and 30 in a plane parallel to the plane of handle 110's rotational movement. When the desired horizontal position is obtained, handle 110 is disengaged from the vertical position, thereby allowing interfacing ridges 125 of indexing sleeve 120 to slide into a new position within teeth 145 of locking ring 140.

FIGS. 6 and 7 illustrate the engagements of sealing tube 80 of the present invention. As shown in FIG. 6, sealing tube 80 can be mounted on mounting plate 90 by way of bolts 92 and anchoring dowels 93. Anchoring dowels 93 assist in reducing stress on bolts 92 caused by movement of sealing tube 80. FIG. 7 shows the incorporation of locking ring 140 into sealing tube 80. In the preferred embodiment of the present invention, the internal surface of sealing tube 80 is configured to accommodate locking ring 140. Locking ring 140 can be secured to sealing tube 80 by screws 81.

The outrigger assembly of the present invention is intended for mounting on a surface of a boat or related boat support structure. It should be noted that the side surface of a boat as used herein can be any supporting surface of a boat including, but not limited to, the use of a T-top as a base structure for supporting the outrigger assembly.

Outrigger assembly 10 has boom attachment arm 20 that incorporates pull-pin 25. In use, a boom is inserted into boom attachment arm 20, and then secured within boom attachment arm 20 by pull-pin 25. Boom attachment arm 20 is operatively engaged to rotating arm, the operative engagement accomplished through an arrangement where adjustor 41 is twisted on a screw 50 running through an intersection point of arms 20 and 30.

Boom attachment arm 20 can then be raised or lowered to the desired angle within the vertical plane. Detent plate 71 and detent bullet 73 in proximal end portion 21 of boom attachment arm 20 imparts the user with the ability to locate a securable angle. As adjustor 41 is twisted in a manner that reduces the distance between adjustor 41 and the operative engagement of arms 20 and 30, washer plate 60 presses bullets 70 through bullet holes 23 in proximal end portion 21 of the boom attachment arm 20.

Bullets 70 partially pass through bullet holes 23, terminating in dimples 35 on at least one surface of distal head portion 31 of rotating arm 30, thereby securing the vertical angle of operative engagement between arms 20 and 30. Rotating arm 30 includes indexing sleeve 120 to facilitate rotational position adjustment. The body of rotating arm 30 is contained within sealing tube 80 for protection from the environment. Sealing tube 80 is bolted to mounting plate 90 and includes locking ring 140 for accommodating indexing sleeve 120 of rotating arm 30.

Indexing sleeve 120 has interfacing ridges 125 that provide a slideable securement between locking ring 140 and rotating arm 30. Interfacing ridges 125 engage teeth 145 on the inner wall of locking ring 140. The outer wall of the bottom portion of locking ring 140 can be secured to a structure, such as sealing tube 80.

Mounting plate 90 can additionally contain boltholes to allow mounting plate 90 to be bolted to at least one surface. Mounting plate 90 is further engaged to rotator 100. Rotator 100 can utilize bearings, washers, or the like to provide rotational movement for the engagement. Rotator 100 further contains a handle opening (not shown) to accommodate handle 110. The handle opening contains notches to provide a handle pivot point.

Handle 110 passes through the handle opening of rotator 100, engaging the handle pivot point. The terminal end of handle 110 further engages handle slot 139 of rotator arm 30. When handle 110 is operatively engaged in a vertical plane, arms 20 and 30 are lifted. This lifting action causes indexing sleeve 120 to disengage from teeth 145 of locking ring 140. At this point, handle 110 is rotationally engaged in a horizontal plane to rotate arms 20 and 30 in a plane parallel to the plane of handle 110's rotational movement. When the desired horizontal position is obtained, handle 110 is disengaged from the vertical position, thereby allowing indexing sleeve 120 to slide into a new position within teeth 145 of locking ring 140.

Although only a few exemplary embodiments of the present invention have been described in detail above, those skilled in the art will readily appreciate that numerous modifications are to the exemplary embodiments are possible without materially departing from the novel teachings and advantages of this invention. Accordingly, all such modifications are intended to be included within the scope of this invention as defined in the following numbered claims.

What is claimed is:

1. A sport fishing outrigger assembly comprising:
    a boom attachment arm having a distal end portion and proximal end portion;
    a rotating arm having a distal head portion capable of releasable attachment to said proximal end portion and a handle engagement;
    an adjuster for adjusting said releasable attachment of said distal head portion to said proximal end portion;
    an indexing sleeve secured to said rotating arm;
    a rotator operatively engaged to said rotating arm; and
    a handle operatively engaged to said handle engagement and said rotator.
2. The outrigger assembly according to claim 1 wherein said rotator is operatively engaged to a mounting plate.
3. The outrigger assembly according to claim 2 wherein said indexing sleeve is releasably secured to a locking ring.
4. The outrigger assembly according to claim 1 wherein said distal end portion is capable of accommodating a boom.
5. The outrigger assembly according to claim 4 wherein said boom attachment arm includes a pull-pin for securing said boom.
6. The outrigger assembly according to claim 1 wherein said boom attachment arm can be placed in at least one position of a plurality of positions on said distal head portion.
7. The outrigger assembly according to claim 6 wherein said plurality of positions are dimples.
8. The outrigger assembly according to claim 1 wherein said distal head portion further includes a boom stop.
9. The outrigger assembly according to claim 3 wherein said indexing sleeve includes at least one interfacing ridge.
10. The outrigger assembly according to claim 9 wherein said at least one interfacing ridge slidably secures said indexing sleeve to said locking ring.
11. The outrigger assembly according to claim 10 wherein said locking ring is secured to a sealing tube.
12. The outrigger assembly according to claim 11 wherein said indexing sleeve is contained within said sealing tube.
13. The outrigger assembly according to claim 12 wherein said locking ring includes a plurality of teeth.
14. The outrigger assembly according to claim 13 wherein said plurality of teeth slidably secures said at least one interfacing ridge.
15. The outrigger assembly according to claim 14 wherein said handle operating engages said rotating arm to provide movement along a first axis.
16. The outrigger assembly according to claim 15 wherein said handle operatively engages said rotating arm to provide movement along a second axis.
17. The outrigger assembly according to claim 16 wherein said handle disengages said at least one interfacing ridge from said plurality of teeth.
18. The outrigger assembly according to claim 17 wherein said handle reengages said at least one interfacing ridge to said plurality of teeth.

* * * * *